(12) United States Patent
Huang

(10) Patent No.: US 8,436,567 B2
(45) Date of Patent: May 7, 2013

(54) FAN SPEED CONTROL CIRCUIT

(75) Inventor: Yong-Zhao Huang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 75 days.

(21) Appl. No.: 13/171,659

(22) Filed: Jun. 29, 2011

(65) Prior Publication Data
US 2012/0274255 A1 Nov. 1, 2012

(30) Foreign Application Priority Data

Apr. 28, 2011 (CN) .......................... 2011 1 0107940

(51) Int. Cl.
*G05D 23/24* (2006.01)
(52) U.S. Cl.
USPC .......... 318/472; 361/106; 361/91.6; 361/514; 361/18; 361/19
(58) Field of Classification Search .................. 318/472; 361/18, 25, 91.6, 106
See application file for complete search history.

(56) References Cited

U.S. PATENT DOCUMENTS

| | | | | |
|---|---|---|---|---|
| 3,054,905 A * | 9/1962 | Lee | ................. | 307/412 |
| 4,392,093 A * | 7/1983 | Paule et al. | .................. | 318/245 |
| 4,806,832 A * | 2/1989 | Muller | .......................... | 388/833 |
| 6,342,997 B1* | 1/2002 | Khadkikar et al. | ........... | 361/103 |
| 6,373,320 B1* | 4/2002 | Musiol et al. | ................. | 327/478 |
| 6,396,238 B1* | 5/2002 | Miyahara | ...................... | 318/807 |
| 7,012,400 B2* | 3/2006 | Yu | ................. | 318/800 |
| 2004/0165325 A1* | 8/2004 | Horng et al. | .................... | 361/25 |
| 2009/0033409 A1* | 2/2009 | Shih et al. | ..................... | 327/538 |
| 2010/0033113 A1* | 2/2010 | Maruyama et al. | ........... | 315/309 |
| 2010/0327792 A1* | 12/2010 | Huang | .......................... | 318/471 |
| 2011/0069419 A1* | 3/2011 | Su et al. | .......................... | 361/56 |

* cited by examiner

*Primary Examiner* — Walter Benson
*Assistant Examiner* — Said Bouziane
(74) *Attorney, Agent, or Firm* — Altis Law Group, Inc.

(57) ABSTRACT

A fan speed control circuit for controlling the rotation speed of a fan motor unit. The speed control circuit includes a resistor, a voltage stabilizing unit, a transistor and a thermal resistor. The resistor is connected to a power source of the fan motor unit, the voltage stabilizing unit is connected between the resistor and ground. The collector of the transistor is connected to the fan motor unit, the base is connected to a node between the resistor and the voltage stabilizing unit. The thermal resistor is connected between an emitter of the transistor and ground.

5 Claims, 2 Drawing Sheets

FAN SPEED CONTROL CIRCUIT

BACKGROUND

1. Technical Field

The disclosure relates to fans, and more particularly to a fan with a speed control circuit.

2. Description of Related Art

Nowadays, many electronic devices generate heat during operation. Heating can adversely affect the operational stability of electronic devices. Heat building up in electronic devices can result in unreliable and unstable operation and may even destroy the electronic device. Therefore, heat should be removed timely in order to keep the temperature of the electronic devices within a safe range. Fans have been used in the electronic devices to provide forced airflows to dissipate the heat. Generally, a fan with a one fixed speed will produce more vibration and noise than a fan capable of adjustment.

What is needed, therefore, is a fan to eliminate or mitigate these problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
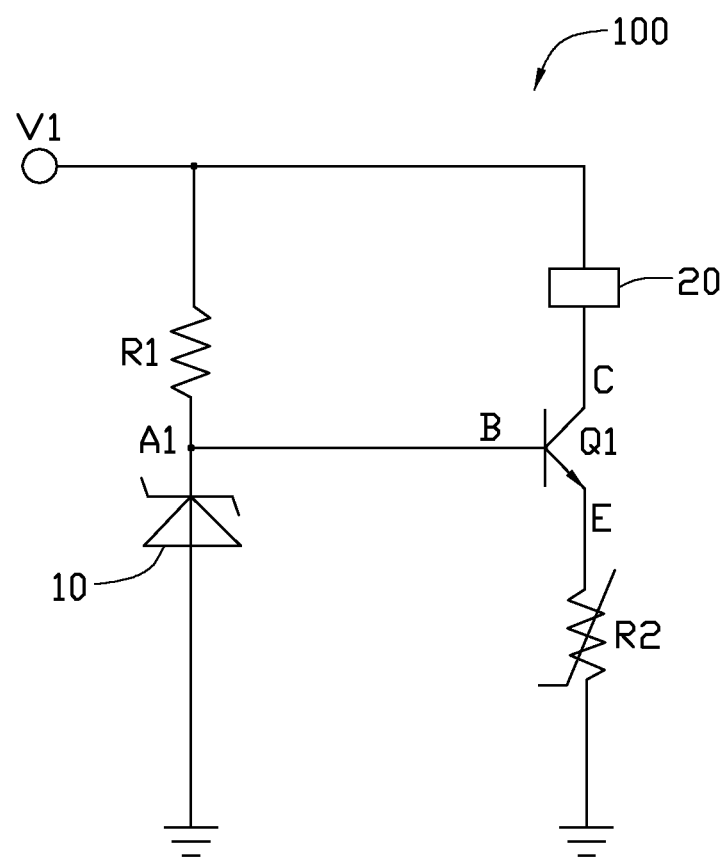
FIG. 1 is a schematic diagram showing a fan speed control circuit in accordance with a first embodiment of the disclosure.

Referring to FIG. 1, a fan speed control circuit 100 in accordance with a first embodiment of the present disclosure comprises a power source V1, a resistor R1, a voltage stabilizing unit 10, a fan motor unit 20, a transistor Q1 and a thermal resistor R2.

The resistor R1 is connected between the power source V1 and the voltage stabilizing unit 10 and the voltage stabilizing unit 10 is connected to ground. A node A1 is defined between the resistor R1 and the voltage stabilizing unit 10. In this embodiment, the voltage stabilizing unit 10 is a Zener diode. The fan motor unit 20 is connected between the power source V1 and a collector of the transistor Q1. A base B of the transistor Q1 is connected to the node A1 between the resistor R1 and the voltage stabilizing unit 10. The thermal resistor R2 is connected between an emitter E of the transistor Q1 and ground. In this embodiment, the transistor Q1 is NPN-type transistor; the thermal resistor R2 is a negative temperature characteristic (NTC) thermal resistor, that is, the resistance of the thermal resistor R2 decreases as the temperature of the thermal resistor R2 rises.

When the fan speed control circuit 100 is working, the voltage Vb at the base B of the transistor Q1 is constant. Voltage Ve of the emitter E of the transistor Q1 is always about 0.7V less than Ve. When the temperature of the electronic device increases, the resistance of the thermal resistor R2 decreases, and the amount of current flowing through the thermal resistor R2 and the fan motor unit 20 can increase. The increased current available to the fan motor unit 20 makes the fan speed increase. When the temperature of the electronic device goes down, the resistance of the thermal resistor R2 increases and the current flowing through the thermal resistor R2 and the fan motor unit 20 is restricted. The lower current available to the fan motor unit 20 reduces the fan speed.

Therefore, when the temperature increases, the fan speed control circuit 100 drives the fan motor unit 20 to rotate faster. When the temperature decreases, the fan speed control circuit 100 drives the fan motor unit 20 to rotate slower. Furthermore, the voltage stabilizing unit 10 can protect the fan motor unit 20 against voltage spikes and other transients from the power source V1.

Figure 2:
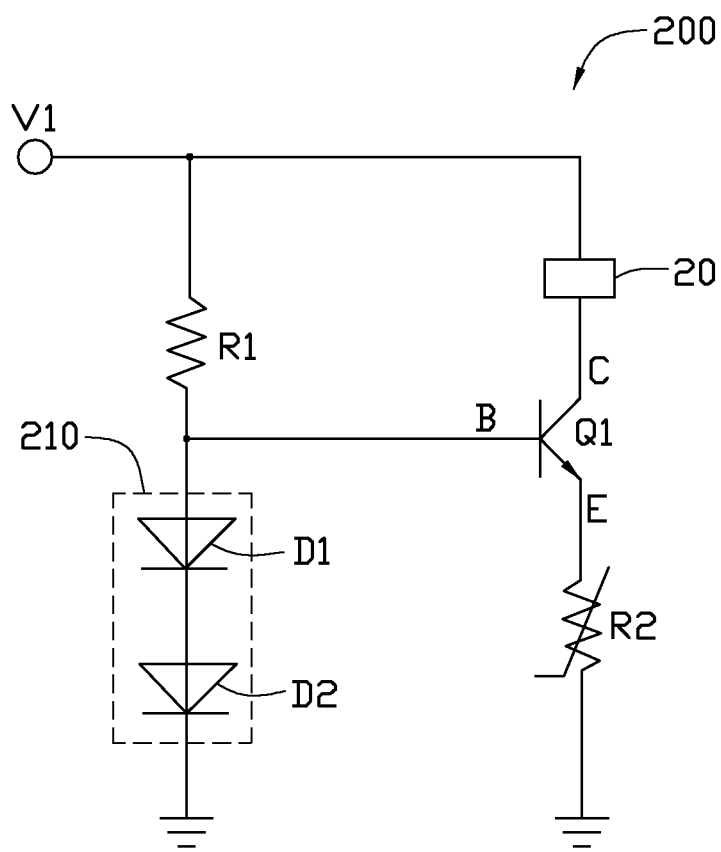
FIG. 2 is a schematic diagram showing a fan speed control circuit in accordance with a second embodiment of the disclosure.

Referring to FIG. 2, a fan speed control circuit 200 in accordance with a second embodiment of the present disclosure is shown. The main point of difference to the fan circuit 100 of the first embodiment, is that a voltage stabilizing unit 210 of the fan speed control circuit 200 includes two diodes D1, D2. The diodes D1, D2 are connected in series. Alternatively, the number of diodes in the voltage stabilizing unit 210 can be more than two.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A fan speed control circuit for controlling a rotation speed of a fan motor unit, the fan speed control circuit comprising:
    a first branch comprising a resistor and a voltage stabilizing unit series connecting the resistor, the resistor provided for connecting to a power source of the fan motor unit, the voltage stabilizing unit connected between the resistor and ground;
    a second branch comprising the fan motor and a thermal resistor and series connecting the thermal resistor to adjust a rotating speed of the fan motor, the first branch and the second branch being two parallel acting branches; and
    a transistor between the first branch and the second branch and connecting the first branch and the second branch, the transistor having a collector for connecting to the fan motor unit, and a base connected to a node between the resistor and the voltage stabilizing unit, the thermal resistor connected between an emitter of the transistor and ground.

2. The fan speed control circuit of claim 1, wherein the voltage stabilizing unit is a Zener diode.

3. The fan speed control circuit of claim 1, wherein the voltage stabilizing unit comprises at least two diodes connected in series.

4. The fan speed control circuit of claim 1, wherein the thermal resistor is a negative temperature characteristic thermal resistor.

5. The fan speed control circuit of claim 1, wherein the transistor is an NPN-type.

* * * * *